United States Patent Office 2,941,957
Patented June 21, 1960

---

2,941,957

PRODUCTION OF OXIDATION CATALYSTS

Peter H. Pinchbeck and Felix B. Popper, Gomersal, near Leeds, England, assignors to The Coal Tar Research Association, Gomersal, near Leeds, England No Drawing. Filed Jan. 2, 1957, Ser. No. 631,999

Claims priority, application Great Britain Jan. 3, 1956

3 Claims. (Cl. 252—440)

This invention relates to an improved catalyst for the oxidation in the vapour phase of hydrocarbons to dicarboxylic acids or anhydrides.

Oxidation catalysts consisting of vanadium pentoxide, potassium sulphate and silica are well known. Preparation of such catalysts have been described, for instance in Flat Report 649 and in British Patent No. 705,615. The starting materials used are potassium silicate, a soluble vanadium salt and sulphuric acid. It is important that such catalysts should have a homogeneous composition throughout and this is achieved in the above patent by coprecipitation of silica, potassium sulphate and a vanadium compound and the catalyst so prepared has improved characteristics over that described in Flat Report 649.

As the vapour phase oxidation of aromatic hydrocarbons is strongly exothermic it is advantageous to operate the reaction by fluid catalysis, for which purpose it is preferred to employ catalyst particles in the form of small spheres, known as microspheres, resistant to attrition and causing less erosion than ground catalyst particles. A similar catalyst of limited size range has been suggested in British Patent No. 633,128, according to which fused vanadium oxide spheres are employed.

The invention consists in a method of producing active vanadium oxide/potassium sulphate/silica catalysts suitable for fluid catalysts, which are micorspherical in shape, of homogeneous composition and of great mechanical strength, by contacting an aqueous solution of sodium silicate with dilute acid in such concentrations and proportions that a silica sol is formed which does not gel at room temperature until at least 10 minutes, preferably at least 15 minutes have elapsed, but which gels at 40° C. in 5 minutes or less, forming this sol into micorspherical gel particles whilst dispersed in an immiscible organic liquid, washing the gel particles with water till they are completely free from sodium and acid ions, treating the washed gel spheres with live steam to remove completely the adhering organic liquid, impregnating the wet micorspherical gel with an aqueous solution of soluble vandium salt and potassium sulphate, both free from sodium ions, by covering the gel completely with the solution and removing, or allowing or effecting evaporation of the free liquid, drying the impregnated spheres at up to 100° C., suitably at 70° C. to 100° C., and calcining the catalyst in air at 350° C. to 450° C.

If the organic liquid used boils at above 100° C., it is preferably displaced, after gel formation, with one boiling at below 100° C. This may conveniently be done below the washing step.

Any acid soluble in water may be used to form the sol, though we prefer to use formic, acetic, or sulphuric acid. On the other hand it has been found that weak micorspheres are produced if the gel is prepared from potassium silicate solutions. To form the sol into microspherical gel particles it may be passed through jets into a vertical column of immiscible organic liquid, such as benzene or gasoline held at 40° C. or higher, the gel forming during the fall of the drop through the liquid; the size of the gel will depend in this case on the diameter of the jets, and the height of the liquid column must be sufficient to ensure that every particle gels during its fall. Alternatively, the silica sol may be poured into an organic liquid to which a small amount of emulsifying agent has been added and the mixture agitated by stirring, till gelation has taken place. In this case we find that the particle size of the gel does not depend on the speed of stirring, provided this is adequate to give good mixing of the liquids, but on the organic liquid used as a dispersion medium and on the emulsifying agent, in a way which we have not been able to predict. In both types of procedure we prefer to use as the organic liquid a hydrocarbon or mixture of hydrocarbons boiling below 100° C. such as benzene or gasoline, and as emulsifying agent an anionic type, such as organic sulphates or sulphonates. Instead of the low-boiling organic liquid, a hydrocarbon or mixture of hydrocarbons boiling above 100° C. such as toluene or kerosene may be employed, that adhering to the spheres after their formation being displaced by washing with a hydrocarbon or mixture of hydrocarbons boiling below 100° C. such as benzene or gasoline. In respect of washing, the gel is considered to be free from sodium ion if the extract from 50 grams of wet microspheres in boiling water after ½ hour reduced to 0.5 cc. and acidified, does not give rise to a yellow colour by the well known flame test. Freedom from organic solvent may be determined in different ways, depending on the organic liquid used. When benzene is employed, we dissolve 20 g. of wet gel in 10% caustic soda, extract the solution with cyclohexane and consider benzene removal complete when the benzene peak at 2550 Angstrom units in an ultra-violet spectroscope vanishes. If the organic solvent is not completely removed, we find that it carbonises in the calcination step and thereby greatly reduces catalyst activity. Any soluble vanadium salt may be employed but we prefer to use vanadyl sulphate or ammonium vanadate. Evaporation of the free liquid may be accelerated by a current of air and/or elevated temperatures up to 90° C., or alternatively the bulk of the free liquid may be removed by filtering, decanting or otherwise. Further drying is then carried out in trays which are acid resistant. Before calcination the catalyst may be sieved to remove the small amount of spheres which are coarser and finer than a desired size range, but removal of fines may also be achieved if the calcination is carried out in a fluid catalyst reaction vessel in such a manner that fines are elutriated.

The following examples show how the invention may be carried into effect.

EXAMPLE I 10.8 litres of sodium silicate (S.G. 1.20) were added with stirring to 13 litres of 15.5% w./v. acetic acid. 35 litres of benzene containing 21 grams of sodium sulphosuccinic acid bis (2-ethyl hexyl) ester (sold as Manoxol O.T. 100%) were added to the silicate with constant stirring using a stirrer speed of 720 r.p.m. The dispersion was warmed to 40° C. and stirring was continued for 1 hour.

The microspherical gel obtained was transferred to a vertical washer, the major part of the benzene displaced by water and the spheres were then washed with a continued stream of water for 20 hours. After this period they were free of sodium; they were run on to a filter to remove excess water and were then transferred to an enamelled vessel where they were treated with live steam for 3 hours, after which time no benzene could be detected.

The microspheres were filtered again, the $SiO_2$ content of the wet spheres determined by ignition of a sample, and based on this the impregnating solution was added. This consisted of 600 grams $K_2SO_4$, 444 grams $VOSO_4$ in 5.75 litres solution for every kilogram of $SiO_2$ as estimated; the solution completely covered the microspheres, and the container was heated to 80° C. and air blown over for 6 hours. The spheres were now spread in about ½ inch layers on acid resistant trays and dried in an air oven at 95° C. till they were free flowing. They were now sieved to retain the bulk of material sized 30 to 80 BSS mesh, and the microspheres were calcined in a horizontal tube at 430° C. for 6 hours, with a stream of air passing over them. After calcination the particles were sieved again to retain a range from 40 to 80 BSS mesh size. In use, at a ratio of air to naphthalene of 81 litres/gram and a contact time of 0.7 seconds 84.1% of the naphthalene was converted to phthalic anhydride, the product having a purity of 94.5%.

EXAMPLE II

Sodium silicate and acetic acid in the same quantities and concentrations as given in the previous example were sprayed with a pressure of 1 p.s.i.g. through nozzles of 0.11" diameter into a vertical 6" tube 10 ft. long, maintained at 40° C. over the upper 7 ft. and at room temperature over the lower portion and filled with benzene. The gelled spheres so obtained were separated from the benzene, and treated as in Example I. The final catalyst had the same activity and selectivity.

To compare the strength of these catalysts, their attrition resistance was tested by the method of W. Forsythe et al. (Industrial and Engineering Chemistry, volume 41, 1949, page 1201) and the results given in the table.

| Material | Catalyst, Example I | Catalyst, Example II | Ground silica gel | Coprecipitated Catalyst, cf. B.P. No. 705615 |
|---|---|---|---|---|
| Attrition Rate | 15.2 | 13.8 | 51.9 | 48.7 |

EXAMPLE III

Sodium silicate and acetic acid in the same quantities and concentrations as given in the previous examples were sprayed through a nozzle into a vertical cylindrical tank 1 ft. in diameter and 10 ft. high containing kerosene of a boiling range of 160–200° C. at a temperature of 90° C. The spheres were collected at the bottom of the vessel and periodically drawn off through a valve and collected on a stoneware filter to remove excess kerosene. The spheres were then washed twice with a petroleum fraction boiling between 40–60° C. and after filtration of the petroleum fraction were washed with water until they were free from sodium and then steamed for three hours after which time hydrocarbon material could not be detected. The excess water was removed by filtration and the spheres were completely covered with a solution of vanadyl sulphate and potassium sulphate of such strength that when equilibrium had been established the final catalyst had a weight ratio of $$V_2O_5:K_2SO_4:SiO_2$$

of 0.26:0.6:1.0. This equilibrium was achieved after soaking for 17 hours and the excess liquid which contained vanadyl sulphate and potassium sulphate was removed by filtration. The spheres were dried below 100° C. and then treated as in Example I. The calcined spheres, when tested by the method outlined in Example II had an attrition rate of 16.9.

We claim:

1. The method of producing an active vanadium oxide/potassium sulphate/silica catalyst suitable for fluid bed catalysts from microspherical silica particles formed by gelling in an immiscible organic liquid a disperse precipitated aqueous silica sol, which comprises washing the particles free of sodium and acid ions, treating the washed particles with live steam to remove residual organic liquid, impregnating the so-cleaned particles with the desired amounts of sodium-free vanadium salt and potassium sulphate in aqueous solution, drying the impregnated particles at up to 100° C. and then calcining in air at 350–450° C.

2. The method according to claim 1 in which the organic liquid used is one which boils at above 100° C. and is displaced before steaming with one boiling at below 100° C.

3. The method set forth in claim 1, in which the amounts of vanadium and potassium salts employed provide a catalyst of approximately the composition $$V_2O_5:K_2SO_4:SiO_2$$

of 0.26:0.6:1.

References Cited in the file of this patent

UNITED STATES PATENTS

| 2,027,316 | Johnson | Jan. 7, 1936 |
| 2,029,376 | Joseph | Feb. 4, 1936 |
| 2,079,507 | Johnson | May 4, 1937 |
| 2,459,903 | Voorhees | Jan. 25, 1949 |
| 2,647,875 | Marisic | Aug. 4, 1953 |
| 2,769,018 | West | Oct. 30, 1956 |